June 22, 1965

W. W. DAVIS 3,191,162

MAGNETIC THIN FILM MEMORY CELL

Filed Feb. 13, 1961

INVENTOR
WILLIAM W. DAVIS
BY
Thomas J. Nikolai
AGENT

United States Patent Office
3,191,162
Patented June 22, 1965

3,191,162

MAGNETIC THIN FILM MEMORY CELL

William W. Davis, Minneapolis, Minn., assignor to Sperry Rand Corporation, New York, N.Y., a corporation of Delaware Filed Feb. 13, 1961, Ser. No. 89,057
11 Claims. (Cl. 340—174)

Figure 1:
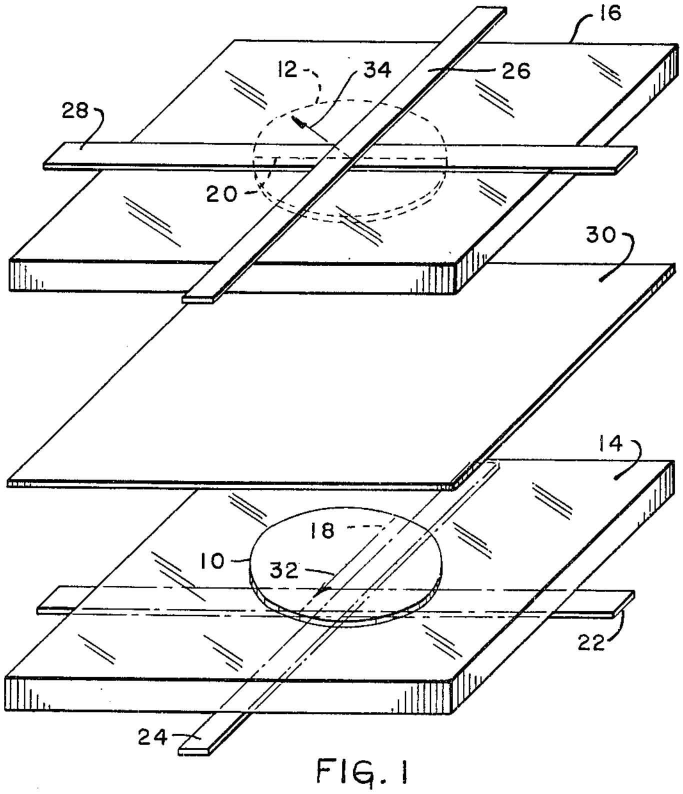

This invention relates generally to storage or memory apparatus suitable for use in digital computing equipment, and more specifically to an improved memory cell arrangement whereby the information content of the cell may be sensed without destroying the information.

In many prior art memory systems used in digital computers, binary information is stored by selectively magnetizing a ferromagnetic core of the type exhibiting rectangular hysteresis loop characteristics to one or the other of its two stable states of remanent magnetization. In these systems, when it is desired to read out or sense the information contained in a particular core, it is necessary to apply fields thereto in a directionn to switch the state of the core. In order that the information be retained in the memory after a readout operation, it is necessary to perform a re-write cycle to restore the information. Since this re-write cycle takes a certain amount of time, it is readily apparent that to increase the computational speed of computing machines it is desirable to be able to sense the information contained in a memory cell without altering the state of magnetization of that cell so that a subsequent re-write cycle is not required.

In the Pohm et al. Patent 3,015,807 assigned to the assignee of the present invention, there is described one arrangement whereby non-destructive sensing of the information content of a magnetic element may be obtained. Two cores termed a memory core and a readout core are positioned with their axes of remanent magnetization deposed transversely to one another. The remanent magnetization of the memory core sets up an internal field in the second or readout core which acts transverse to the remanent field of said readout core. During sensing, this transverse field is either aided or opposed by a first external field so that a second field applied along the remanent magnetization axis of the readout core will cause switching of the readout core only if the transverse field therein has been increased by said first external field. A sense line is inductively coupled to the readout core so that signals are induced therein to give an indication of the state of the remanent magnetization of the core whose information it is desired to sense.

During sensing, one or more external fields are applied to the two cores. Although it is desired that the external fields affect only the so-called readout core, it may happen that these fields will also affect the magnetic state of the memory core. In cores of the thin film type such as those formed in accordance with the teachings of the Rubens Patent 2,900,282, it has been found that the application of a field in a direction transverse to the preferred axis of magnetization which exceeds a predetermined value will tend to demagnetize the elements and there is a danger that the information contained in the memory core will be destroyed. Also, when a thin film pair is used to obtain non-destructive readout, the application of the external fields to the readout films may cause an undesirable rotation of the magnetization of the memory film annd produce noise signals on the sense lines threading the system.

The present invention is concerned with a means for obviating these difficulties by providing a magnetic shield between the memory film and the readout film such that the application of fields to the readout film will not affect the magnetic state of the memory film.

It is therefore the primary object of this invention to provide an improved memory cell arrangement the information in which can be non-destructively sensed without appreciably disturbing the magnetic state of the storage elements containing the information.

Still another object of the present invention is to provide, in a magnetic memory, a conductive shield of non-magnetic material arranged such that fields applied to the readout core do not deleteriously affect the magnetic state of the memory core containing the information to be sensed.

Figure 2:
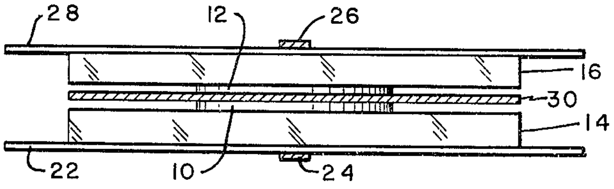

Still other objects of this invention will become apparent to those of ordinary skill in the art by reference to the following detailed description of the exemplary embodiment of the apparatus and the appended claims. The various features of the exemplary embodiment according to the invention may best be understood with reference to the accompanying drawings, wherein:

FIGURE 1 illustrates an exploded pictorial view of a single memory cell constructed in accordance with the teachings of the present invention; and FIGURE 2 illustrates a side elevational of the apparatus of FIGURE 1.

Referring now to FIGURE 1, there is shown a pair of thin ferromagnetic film core elements 10 and 12 deposited on (or otherwise affixed to) a pair of non-conductive substrates 14 and 16. As mentioned previously, films 10 and 12 are preferably formed according to the method described in the aforereferenced Rubens patent. When a suitable ferromagnetic alloy is vapor deposited in a vacuum in the presence of an orienting magnetic field, the resulting article is found to exhibit two stable states of remanent magnetization and a preferred or easy axis of magnetization. One way to reverse the remanent state of a thin filmed magnetic element, is to apply a first field in a direction transverse to the preferred axis of the film and while this field is still being applied, to apply a second field in a direction parallel to a preferred axis. Under these conditions, the magnetization of the film reverses by a rotational process which is much more rapid than the so-called "wall motion" reversal. The preferred axes of the thin films 10 and 12 are indicated on FIGURE 1 by the dotted lines 18 and 20, respectively.

Magnetically linking the thin film 10 are a pair of conductors 22 and 24 which, as will be described more fully hereinbelow, may be used to alter the remanent state of the film 10. Likewise, a pair of conductors 26 and 28 are magnetically coupled to the thin film 12 and are used for interrogating the film to determine its state and for sensing or picking up the resulting signal which appears upon interrogation. Conductor 26 may therefore be termed an interrogate drive line and conductor 28 may be called the sense line. Although in FIGURE 1 the conductors 22, 24, 26 and 28 are illustrated as being thin strips of conductive material, in an actual circuit the conductors are preferably printed wiring which may be formed by any one of a number of well known processes.

Sandwiched between the films 10 and 12 is a thin, conductive, non-magnetic sheet 30 which serves to isolate the film 10 from the interrogate line 26 and the sense line 28. It should be mentioned at this point that the conductive sheet 30 is not a complete barrier to a magnetic field, but serves to introduce a predetermined delay to a changing field, i.e., if the field on one side of the sheet 30 is changed suddenly, a predetermined time elapses before this change is noticed on the other side of the barrier. It has been experimentally and empirically determined for a copper shield that if $H_0$ is the magnitude of a step-change in the field on one side of the shield 30 and applied parallel thereto and H is the field observed on the opposite side of the shield 30, H as a function of time ($t$) may be represented by the equation:

$$H=H_0\left(1-e-\frac{t}{870T}\right)$$

Where $t$ is in nanoseconds and T is the thickness of the shield in mills and $e$ is the base of Napierian system of logarithms. This equation changes for different types of conductive non-magnetic shields.

When operating as a memory cell which can be non-destructively sensed, the film 10 is the core whose magnetic state it is desired to sense (memory core) and the film 12 is the readout core which is switched to indicate the state of the core 10. In FIGURE 1, the film 10 may be abritrarily said to store a binary "1" when it is magnetized in a direction indicated by the vector 32 and to contain a binary "0" when the magnetization vector is 180° from the position indicated. Also, in one embodiment of this invention, the memory film 10 is preferably a ferromagnetic alloy consisting of aproximately 90% cobalt and 10% iron whereas the readout film 12 is a permalloy film consisting of 82% nickel and 18% iron. As such, film 10 has a substantially higher coercive force than does the permalloy film 12. The remanent magnetic field produced by the film 10 therefore affects the magnetization of the film 12 to a relatively high degree whereas the remanent field of film 12 has little effect on the magnetization of the film 10. Since other means are available for making the influence of the memory film on the readout film greater than the influence of the readout film on the memory film, it is not essential that the readout film have a higher coercivity and limitation to a cobalt-iron memory film is not intended. For example, by controlling the relative thicknesses of the two films, the desired inter-action of films can be achieved. In fact, since essentially no external field is applied to the memory film during readout because of the shield, a permalloy film may be used for both the storage element and the readout element.

The effect of the remanent field produced by the memory film 10 on the readout film 12 is to cause a rotation of the remanent magnetization to a position out of alignment with its easy axis. In other words, the remanent magnetic field of the memory film acts as a transverse field on the readout film. As is indicated in FIGURE 1, the remanent field produced by the memory element causes the magnetization of the readout core to rotate from its position in alignment with the easy axis (indicated by the dash line 20) to a new position indicated by vector 34. In order to sense the information content of the memory core, a current pulse is applied to the interrogate drive line 26, the effect of which is to produce an external field in a direction parallel to the easy axis of the readout film. The combination of the transverse field produced by the memory film 10 and the external interrogate field produced by the flow of current through the drive line 26 causes the magnetic state of the readout film 12 to be reversed and in so doing causes a substantial output signal to be induced in the sense line 28 which is arranged parallel to the preferred axis of the film 12. By observing the polarity of the resulting output signal on the sense line 28 the magnetic state of the memory core 10 can be determined. If the memory film is in its arbitrarily defined "1" state, the application of the interrogate field causes a clockwise torque on the magnetization vector 34 because the remanent field produced by the memory film 10 initially caused a clockwise rotation of the remanent magnetization away from the easy axis 20. However, if the memory core 10 is initially in its arbitrarily defined "0" state the remanent field produced thereby would cause a counterclockwise rotation of the remanent vector 34 such that when the interrogate field is applied to the readout film 12 a counterclockwise torque on the magnetization vector takes place. A clockwise rotation of the magnetization of the readout film causes a signal of a first polarity to be induced in the sense line 28 whereas a counterclockwise rotation causes a signal of the opposite polarity to be induced therein.

Were it not for the presence of the conductive shield 30 between the memory film and the drive lines associated with the readout film, a spurious output signal would be generated during readout when the interrogate field is applied parallel to the preferred direction of the readout film, since this would tend to rotate the magnetization vector of the memory element. Also, since the interrogate field is applied in a direction transverse to the preferred direction of magnetization of the memory element there would be a tendency to demagnetize the memory element. It has been found that the inclusion of the conductive shield, as shown, between the memory element and the readout element reduces the field on the memory element to about 5% of the interrogate field during the first 50 nanoseconds of the interrogate pulse. Any rotational signal from the memory element upon application of the interrogate field is almost entirely prevented, as well as any demagnetization of this element. By including the conductive shield in the apparatus it is possible to use interrogate fields of substantially higher intensity than can be used if no shield is employed. As a result, higher outputs are induced in the sense line 28 which thereby considerably improves the signal to noise ratio of the apparatus.

The conductive shield 30 offers still another advantage when it is desired to alter the information contained in the memory core 14. The information contained in the memory core is changed by coincidentally applying a first magnetic field in a direction parallel to the easy axis of the memory core and a second field in a direction transverse to the easy direction. In FIGURE 1 the means for applying the longitudinal field to the film 10 is the conductor 22 which is strung transverse to the easy axis 18. When a current is made to flow through this winding, a magnetic field is set up which acts substantially at right angles to the winding 22, i.e., parallel to the easy axis 18. The conductor 24 being strung parallel to the easy axis 18 of film 10 produces magnetic field which acts transverse to the easy axis when the current is made to flow therethough. The effect of the transverse field is to cause the magnetization vector 32 to rotate out of alignment with the preferred axis so that when a longitudinal field is applied by means of current flow through winding 22 a torque is applied to the magnetization vector causing it to rotate approximately 180°, such that the film is now in the other of its two stable states. Because of the presence of the shield 30 between the windings 22 and 24 and the film 12, the application of short current pulses to these lines does not produce a large enough field to affect the magnetization of the readout core 12.

The main advantage of the use of the copper shield in the memory is that it isolates the functions of reading and writing and makes the non-destructive readout truly non-destructive. One possible limitation to the use of the magentic shield is that a finite amount of time is required for the remanent field of the memory element to penetrate through the copper shield following a writing operation. As long as the writing operation never directly precedes a reading operation the delay is of little importance. However, if the remanent field from the memory element must penetrate through the shield in a given cell before one can read from this cell, then means must be provided, such as by proper programming of the computer using the memory, to prevent the reading out of information immediately after a writing operation.

While there have been shown and described the fundamental novel features of the invention as applied to a preferred embodiment, it will be understood that various omissions and substitutions and changes in the form and details of the apparatus illustrated and in its mode of operation may be made by those skilled in the art, without departing from the spirit of the invention. It is the intention, therefore, to be limited only as indicated by the scope of the following claims.

I claim:

1. A memory cell for use in digital computing equipment, comprising: at least two thin ferromagnetic films at least one exhibiting two stable states of remanent magnetization and a preferred axis of magnetization oriented such that the remanent magnetic field of a first of said films biases the magnetization of a second of said films out of alignment with said preferred axis; means for applying an external field to said second film for at least momentarily altering the magnetization of said second film for indicating the state of the first film; and means interposed between the films for preventing said external field from affecting the remanent magnetization of said first film yet permitting the first film to bias the second film.

2. Apparatus as in claim 1 wherein the last mentioned means consists of a non-magnetic conductor having a thickness substantially greater than either of the film thicknesses.

3. Apparatus as in claim 2 wherein the conductor is a copper sheet.

4. A data storage element for use in digital computing equipment comprising: at least two thin ferromagnetic films of the type exhibiting two stable states and a preferred axis of remanent magnetization, said films being disposed adjacent one another with their respective axes substantially transverse to one another so that the field produced by a first of said films tends to rotate the magnetization of the second of said films out of alignment with its preferred axis; means for applying an external field to said films in a direction substantially aligned with the preferred axis of said second film; and means for preventing said external field from rotating the magnetization of said first film.

5. A data storage element for use in digital computing equipment comprising: at least two thin ferromagnetic films of the type exhibiting two stable states and a preferred axis of remanent magnetization, said films being disposed adjacent one another with their respective axes substantially transverse to one another so that the field produced by a first of said films tends to rotate the magnetization of the second of said films out of alignment with its preferred axis; means for applying an external field to said films in a direction substantially aligned with the preferred axis of said second film; and means including conductive means disposed between said films for preventing said external field from rotating the magnetization of said first film.

6. A data storage element for use in digital computing equipment comprising: at least two thin ferromagnetic films of the type exhibiting two stable states and a preferred axis of remanent magnetization, said films being disposed adjacent one another with their respective axes substantially transverse to one another so that the field produced by a first of said films tends to rotate the magnetization of the second of said films out of alignment with its preferred axis; means for applying an external field to said films in a direction substantially aligned with the preferred axis of said second film to further rotate the magnetization of said second film; and a conductive non-magnetic sheet disposed between said films for preventing said external field from rotating the magnetization of said first film.

7. A digital data storage element having non-destructive readout properties comprising: first and second thin ferromagnetic films, the first one having a coercivity greater than the second, said films being of the type exhibiting two stable states and a preferred axis of magnetization and being disposed adjacent one another in parallel relation with their preferred axes transverse so that the magnetic field produced by said first film rotates the magnetization of said second film away from its preferred axis in a direction determined by the state of said first film; means for applying an external field to said films to cause rotational switching of said second film; winding means inductively coupled to said second film for detecting signals produced by said rotational switching, the polarity of said signals being indicative of the state of said first film; and a conductive and non-magnetic shield disposed between the films for preventing any flux transients of said external field from deleteriously affecting the magnetic state of said first film.

8. A digital data storage element which may be non-destructively interrogated comprising: at least two thin ferromagnetic films of the type exhibiting two stable states and a preferred axis of remanent magnetization, a first of said films having a higher degree of coercivity than the second of said films, said films being oriented adjacent one another so that the remanent field produced by said first film tends to rotate the magnetization of said second film away from its preferred axis; means for applying a first external field to said films in a direction transverse to the preferred axis of said second film; means for applying a second external field to said films in a direction parallel to the preferred axis of said second film; signal pickup means coupled to said second film so that signals are induced therein upon application of said second external field if said first external field aids the remanent field of said first film and no signal is induced therein if said second external field opposes said remanent field of said first film; and a conductive shield disposed between said first and second films to prevent said externally applied fields from deleteriously affecting the magnetic state of said first film element.

9. A digital data storage element which may be non-destructively interrogated to determine the information content thereof, comprising: at least two thin ferromagnetic films of the type exhibiting two stable states and a preferred axis of remanent magnetization, a first of said films having a higher degree of coercivity than the second of said films, said films being oriented adjacent one another so that the field produced by said first film tends to rotate the magnetization of said second film away from its preferred axis; first printed circuit winding means adapted to be connected to a source of current for providing a first external field transverse to said preferred axis of said second film; second printed circuit winding means adapted to be connected to a separate source of current for applying a second external field in coincidence with said first external field to said second film in a direction substantially parallel to its preferred axis; further printed circuit winding means inductively coupled to said second film for picking up signals which occur upon application of said second field only if said first field aids the remanent field of said first film; and a conductive non-magnetic shield disposed between said first and second films to prevent said first and second externally applied fields from deleteriously affecting the magnetic state of said first film element.

10. A digital data storage element which may be non-destructively interrogated to determine the information content thereof, comprising: first and second thin ferromagnetic films of the type exhibiting two stable states and a preferred axis of remanent magnetization, the first of said films having a higher degree of coercivity than said second film, said films being oriented adjacent one another with their preferred axes substantially aligned; means for applying a first external field to said films in a direction parallel to said preferred axes; means for applying a second external field to said second film in a direction transverse to its preferred axis at least in part in time coincidence with said first external field; magnetization change detecting means coupled to said second film so that detectable signals are induced therein upon application of said second external field if said first external field opposes the remanent field of said first film and insubstantial signals are induced therein if said first external field aids the remanent field of said first film; and a conductive non-magnetic shield disposed between said first and second films for preventing said external fields from deleteriously affecting the magnetization of said first film.

11. Apparatus as in the claim 10 wherein the shield is a copper sheet having a thickness greater than either film.

References Cited by the Examiner

UNITED STATES PATENTS

| | | | |
|---|---|---|---|
| 2,984,825 | 5/61 | Fuller | 340—174 |
| 3,015,807 | 1/62 | Pohm | 340—174 |

OTHER REFERENCES

Publication I: "Computer Elements," Electrical Manufacturing (Pub. No. 89A), pages 56–60.

Publication II: "Coincident-Current Nondestructive Readout From These Magnetic Films," by Oakland, Journal of Applied Physics, Supplement of vol. 30, No. 4, pages 54s–55s.

IRVING L. SRAGOW, *Primary Examiner.*

JOHN T. BURNS, *Examiner.*